Sept. 22, 1931.   W. AULL, JR   1,824,031
VARIABLE CONDENSER
Filed Nov. 19, 1928
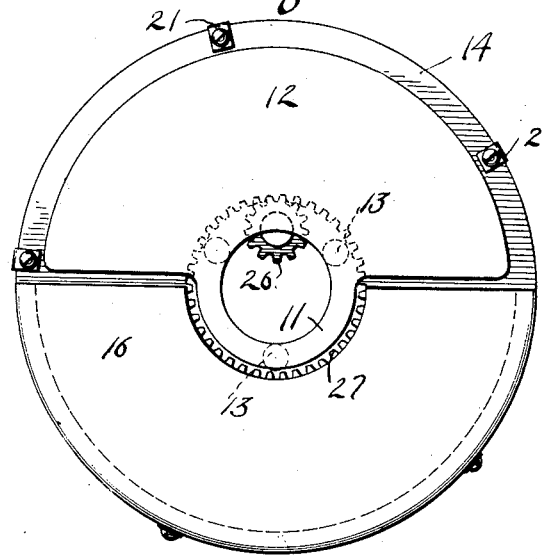
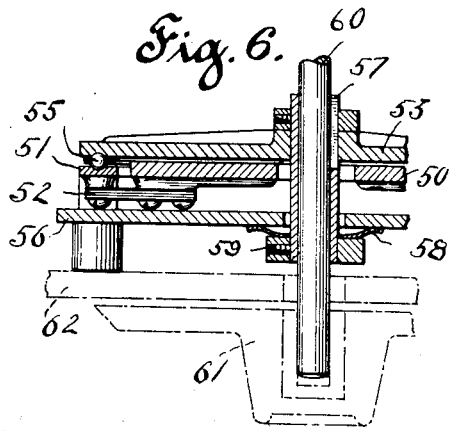
INVENTOR
Wilson Aull, Jr.
BY
ATTORNEY Patented Sept. 22, 1931

1,824,031

UNITED STATES PATENT OFFICE

WILSON AULL, JR., OF ASTORIA, NEW YORK

VARIABLE CONDENSER

Application filed November 19, 1928. Serial No. 320,337.

The ordinary form of variable condenser, commonly used in radio reception, consists of two sets of plates, one set fixed in position and the other set secured to a rotatable shaft and arranged to mesh or interleave with the stationary plates.

The chief disadvantage inherent in this old type of condenser is that slight mechanical variations in the shaft or bearings are amplified by lever action so that one-thousandth of an inch "play" in the bearing may well become several thousandths at the edges of the rotor plates with multiplied variations in the capacity of the condenser for a given angular setting. Likewise, the outer edges of the movable plates are not supported and warping of the plates gives a similar disturbing result.

The chief improvement in my invention relates to the use of what I will term an annular bearing,—a bearing which may, though not necessarily, extend around the periphery rather than at the center of the condenser. A slight mechanical inaccuracy in such bearing will not be amplified but minimized especially when the bearing has a greater radius than that of the movable plates. Moreover, the movable section is much more rigidly supported by this mode of construction.

There are many other advantages inherent in such an arrangement. One of these is that much less clearance distance may be safely used between rotor and stator plates. That is, instead of an air gap of thirty or forty thousandths of an inch between plates as is usual, less than one-half this distance can be used with greater safety and uniformity of capacities for given settings than is now obtainable, assuming that the design is skillfully carried out.

Thus, fewer plates are necessary for a given capacity with consequent saving in bulk, material and labor.

Due to the short distance between plates, stray electro-static fields in the condenser are reduced to a minimum and a very small total volume of dielectric is used with consequent gain in the direction of low dielectric losses. Likewise, by the use of die castings, a one-piece rotor and a one-piece stator may be used with a better power factor resulting, as compared to a multi-plate arrangement.

The present application is a partial continuation of #132,974, filed Sept. 1, 1926, where the invention is broadly claimed.

Fig. 1 is a transverse section and edge view of one form of construction embodying my invention with the rotor supported at its extreme outer edge.

Fig. 2 is a front view of the condenser of Fig. 1 showing the rotor in the position of minimum capacity.

Fig. 3 is a fragmentary section of the rotor of Figs. 1 and 2.

Fig. 4 is a fragmentary section showing the rotor of Fig. 1 but with its bearing nearer the center.

Fig. 5 is a fragmentary section and edge view showing a modification in which the stator is supported on its outer edge and the rotor supported by a bearing intermediate the center and its extreme outer edge.

Fig. 6 is a transverse section of another modification showing the rotor and stator supported on their outer edges but with a central clamp and operating spindle.

In the form shown in Fig. 1, the supporting plate 10 carries both the stator and rotor. The stator ring 11 has a number of plates 12—12 constituting capacity areas, any number and size of which may be employed.

This stator member is supported through insulators 13 from plate 10.

The rotor has a main plate 14 and is provided with a flange 15 which supports segments 16 corresponding with the rotor segments. The segments of the rotor and stator members may be designed to produce any desired characteristic or change of capacity rate with respect to angular settings.

The rotor is supported at a point remote from the center and may even be supported at its extreme outer edge by any suitable bearing, for instance, a series of ball bearings 17 arranged to travel in bearing rings or races 18 and 19. A spacer ring 20 may be employed if desired, to maintain the balls in the proper relative positions. The stator may be clamped or held toward the base plate 10 in any suitable manner as for instance, by a series of clips 21 secured to one member and bent or flanged around the edge of the other. These clips may have spring characteristics for yieldingly holding them together if desired and thus automatically take up wear.

The condenser may be mounted in any suitable manner as for instance, by attachment to a panel 22 by supports 23.

The rotor may be manually or otherwise rotated to the desired setting either by direct engagement with the rim of the rotor or through a knob or handle member 24, shaft 25, and pinion 26, meshing with the internal gear 27.

Fig. 4 shows the bearing 17 and ring 18 somewhat smaller in diameter than the rotor.

In the construction shown in Fig. 5 the stator has a base ring 30 with a flange 31 and plate segments 32 of any desired number, design, and so forth.

The rotor has a ring 33 with plates 34 corresponding with the plates of the stator. The ring 33 of the rotor is supported by a bearing of large diameter which may be afforded by a series of balls 35 travelling in the raceways 36 and 37, remote from the axis of the rotor.

The rotor and stator are supported by plate 38 through the medium of bearing ring 37 and insulators 39. The parts are clamped together in this case by a central shaft 40 and a spring washer 41 and nut or collar 42, which may be adjusted to create more or less pressure.

In this case the rotor is adjusted or moved by means of a shaft 43 eccentric to the rotor supported in a bushing 44 and provided with a pinion 45 meshing with the gear 46 inside the rotor ring 33.

The entire structure may be supported in any suitable manner as for instance, by the panel 47 and supports 48 connected to the plate 38. The shaft 43 may be operated by any suitable drum, knob or handle 49.

In the form shown in Fig. 6, the stator 50 is supported from a ring 51 at its outer edge through the medium of insulating bars 52. The rotor 53 travels on a suitable bearing on the ring 51, for instance, a series of balls 55.

The bearing ring 51 is supported by a base plate 56 in any suitable manner and the rotor is clamped or held to this base plate 56 by means of a sleeve 57, spring washer 58, and collar 59, by which pressure of the spring may be adjusted. It will be understood of course that the actual bearing which determines the spacing of the rotor and stator is provided by the balls at the outer edge and not by the central bushing and spring 58. The rotor may be controlled by a shaft 60 and knob or dial 61. The entire structure of course may be supported in any suitable manner as for instance, by a panel board 62.

It should be understood that the construction of Figs. 1 and 4 may utilize central clamping means such as the spindle 40 of Fig. 5 or the tubular bushing 57 of Fig. 6 in place of the spring clips 21 and vice versa.

In all of the forms shown and described, it will be seen that the rotating member is supported not on a central shaft as has been customary in this art, but in an annular bearing removed quite a distance from the axis. The result is that the rotor is not only protected against injury, displacement, or warping by any cause, but the rotor can be designed to be accurately spaced away from the stator at a minimum distance with assurance that this spacing can always be secured and maintained in manufacture, assembly, and use.

This arrangement also peculiarly lends itself to shielding against outside disturbances by reason of its compactness and the method of annular support.

It is also possible by reason of the adaptability to close spacing of the plates to obtain a desired capacity with fewer plates than are required by the usual methods of construction in which greater clearance is required.

It will also be understood that the plates may be of uniform thickness, wedge-shaped or tapered, or curved or warped, as is employed in various types of condensers. It will also be obvious that the effect of tapered or wedge-shaped plates may be produced by having the plane of the bearing support for the rotor inclined somewhat with respect to the plane of the stator plate or plates, or the stator plates might themselves be either wedge-shaped or somewhat inclined with respect to the plane of the rotor surface.

I claim:

1. A condenser comprising, a support, a bearing ring carried thereby, a substantially rigid rotor having an annular bearing supported by said bearing ring and its center free, and a stator supported by said support within said rotor but insulated therefrom.

2. A condenser comprising a bearing ring, a rotor member having a plurality of superposed plates, and a single annular ball bearing rotatably supported on the bearing ring resilient means for holding said rotor member in place on its bearing and a plurality of superposed fixed stator plates supported adjacent said ring and insulated from said ring.

3. A variable electrostatic condenser comprising a support, a fixed stator having circumferentially spaced insulators connected to the support, a rotor having an annular metallic bearing at its edge and coacting with said support and means for yieldingly holding the rotor bearings in place.

4. A variable condenser comprising a stator and a rotor, a single annular ball bearing support for the edge of said rotor and means for yieldingly holding said rotor in place on said annular bearing support and means supported independently of the rotor member for rotating the same.

WILSON AULL, JR.